United States Patent
Decker et al.

(10) Patent No.: US 10,900,862 B2
(45) Date of Patent: Jan. 26, 2021

(54) GROSS LEAK MEASUREMENT IN AN INCOMPRESSIBLE TEST ITEM IN A FILM CHAMBER

(71) Applicant: INFICON GMBH, Cologne (DE)

(72) Inventors: Silvio Decker, Cologne (DE); Norbert Rolff, Cologne (DE)

(73) Assignee: INFICON GmbH, Cologne (DE)

( * ) Notice: Subject to any disclaimer, the term of this patent is extended or adjusted under 35 U.S.C. 154(b) by 296 days.

(21) Appl. No.: 16/063,371

(22) PCT Filed: Dec. 20, 2016

(86) PCT No.: PCT/EP2016/081867
§ 371 (c)(1),
(2) Date: Jun. 18, 2018

(87) PCT Pub. No.: WO2017/108754
PCT Pub. Date: Jun. 29, 2017

(65) Prior Publication Data
US 2018/0372579 A1 Dec. 27, 2018

(30) Foreign Application Priority Data
Dec. 21, 2015 (DE) .......................... 10 2015 226 360

(51) Int. Cl.
*G01M 3/32* (2006.01)
*G01M 3/04* (2006.01)

(52) U.S. Cl.
CPC ............ *G01M 3/3218* (2013.01); *G01M 3/04* (2013.01); *G01M 3/3236* (2013.01)

(58) Field of Classification Search
CPC .................... G01M 3/3218; G01M 3/3236
See application file for complete search history.

(56) References Cited

U.S. PATENT DOCUMENTS

| 3,504,528 A | 4/1970 | Weinberg et al. |
| 6,082,184 A * | 7/2000 | Lehmann ............ G01M 3/3281 73/49.3 |

(Continued)

FOREIGN PATENT DOCUMENTS

| CN | 1519549 | 8/2004 |
| CN | 101424581 | 5/2009 |

(Continued)

*Primary Examiner* — Eric S. McCall
*Assistant Examiner* — Timothy P Graves
(74) *Attorney, Agent, or Firm* — Kirton & McConkie; Craig Metcalf

(57) ABSTRACT

The invention relates to a method for the gross leak measurement of an at least partially incompressible test object (18) in a film chamber (12) that comprises at least one flexible wall region and is connected, in a gas-conducting manner, to a pressure sensor (30), a vacuum pump (26) and, by way of a calibration valve (34), to a calibration chamber (36) enclosing a calibration volume (37), comprising the steps of evacuating the film chamber (12), measuring the pressure curve within the film chamber (12) after the evacuation is completed, connecting, in a gas-conducting manner, the calibration volume (37) to the inner volume of the film chamber (12) during the measurement of the pressure curve, the pressure being measured before the gas-conducting connection is established, and with the gas-conducting connection established, to the film chamber (12), and the pressure in the calibration chamber (36) prior to the connection to the film chamber (12) being higher or lower than the pressure in the film chamber (12), characterized in that the pressure difference $\Delta p_{leer}$ between the pressure before the gas-conducting connection is established and the pressure with a gas-conducting connection to the film chamber (12), in the case of an empty film chamber (12) comprising no test object (18), is compared to the corresponding pres- (Continued)

sure difference $\Delta p_{Prüfling}$ when a test object (18) is present in the film chamber (12).

8 Claims, 4 Drawing Sheets

(56) References Cited

U.S. PATENT DOCUMENTS

| | | | | |
|---|---|---|---|---|
| 8,201,438 B1 * | 6/2012 | Thornberg | ............... | G01M 3/34 |
| | | | | 73/49.2 |
| 2001/0003917 A1 | 6/2001 | Sagi et al. | | |
| 2006/0277975 A1 | 12/2006 | Barcan | | |
| 2014/0311222 A1 * | 10/2014 | Decker | ................ | G01M 3/027 |
| | | | | 73/40 |

FOREIGN PATENT DOCUMENTS

| | | |
|---|---|---|
| CN | 104040317 | 9/2014 |
| CN | 104718442 | 6/2015 |
| DE | 2458137 | 6/1976 |
| DE | 19513199 | 10/1995 |
| DE | 102011086486 | 5/2013 |
| DE | 102014219481 | 3/2016 |

\* cited by examiner

GROSS LEAK MEASUREMENT IN AN INCOMPRESSIBLE TEST ITEM IN A FILM CHAMBER

This application is a National Stage of International Application No. PCT/EP2016/081867, filed Dec. 20, 2016, and entitled GROSS LEAK MEASUREMENT IN AN INCOMPRESSIBLE TEST ITEM IN A FILM CHAMBER, which claims the benefit of DE 10 2015 226 360.6, filed Dec. 21, 2015. This application claims priority to and incorporates herein by reference the above-referenced applications in their entirety.

The invention relates to a method for detecting a gross leak on an at least partially incompressible test object in a film chamber.

A film chamber is a special form of test chamber for receiving a test object to be leak-tested. The film chamber is characterized in that at least one wall region is made of a flexible material (film, foil). A test object to be leak-tested is placed inside the film chamber, and the film chamber is subsequently evacuated. During the evacuation of the film chamber, air is drawn out of the film chamber in the region outside the test object, whereby the flexible film chamber wall nestles against the test object. A particularly suitable film chamber is composed of two film layers that are placed against one another and enclose the test object and that are joined to one another in a gas-tight manner in the edge regions thereof. During the evacuation of the film chamber, the film is drawn toward the test object except for remaining dead volumes. The pressure curve inside the film chamber, in the region outside the test object, is then measured by way of a pressure sensor. When gas escapes from the test object through a leak in the test object, the correspondingly measured increase in pressure serves as an indication of a leak. The leakage rate can be measured based on the increase in pressure. For this purpose, the film chamber volume, which is to say the interior volume enclosed by the film chamber, must be known. The film chamber volume that is present after evacuation depends on the size and the shape of the test object. Dead volumes arise when the film does not nestle perfectly against the test object.

The film chamber itself gives off gas into the film chamber volume, for example through components outgassing from the film chamber wall. This results in an increase in pressure (offset pressure increase) inside the film chamber. This offset pressure increase and the dead volumes of the film chamber influence the measured leakage rate. This results in an error in the determination of the leakage rate. So as to avoid this error, conventionally a prior measurement is carried out using a tight test object to record the offset pressure increase and the dead volumes. At the most, the dead volumes can only be determined by way of a product-dependent calibration prior to the actual measurement. As soon as the test object is changed, for example in the case of a random sampling test, or as soon as the number of test objects changes, a prior product-dependent calibration is imprecise.

The German patent application number 10 2014 219 481.4, the content of which is hereby included in the present application by reference, describes joining the inner space of the film chamber, which is to say the film chamber volume enclosed by the film chamber, to a calibration volume enclosed by a calibration chamber in a gas-conducting manner. A calibration valve, which is used to close the gas conduction path between the film chamber and the calibration chamber during the evacuation of the film chamber, is provided between the film chamber and the calibration chamber. After the film chamber has been evacuated, and while the pressure change inside the film is being measured by way of the pressure sensor, the calibration valve is opened, wherein, upon opening of the calibration valve, the pressure inside the calibration chamber is higher or lower than inside the evacuated film chamber.

After the calibration valve has been opened, gas flows from the calibration chamber into the film chamber (or vice versa), resulting in a sudden pressure increase or drop inside the film chamber. This change in pressure may be referred to as an abrupt pressure stroke. The pressure stroke is dependent on the film chamber volume. In case of an empty film chamber, which is to say without a test object, this is the entire inner volume of the film chamber. When a test object is present in the film chamber, this is the remaining volume inside the film chamber in the region outside the substantially tight test object. Based on the pressure stroke it is possible, during each measurement, to exactly ascertain the respective current film chamber volume, and thus the leakage rate, from the pressure increase. A prior separate calibration measurement is then no longer required.

It is described that the film chamber volume is determined from the difference between the pressure in the calibration volume before the calibration valve is opened (known, preferably atmospheric, pressure) and the pressure inside the film chamber after the calibration valve has been opened.

An at least partially incompressible test object shall be understood to mean a test object that may be, for example, an at least partially rigid test object or a test object containing stable items, such as packaging comprising foodstuffs contained therein. The special feature of such test objects is that a major leak does not cause these to change the outer appearance thereof to the same extent as is the case with a compressible, which is to say dimensionally non-stable, fully or substantially compressible test object. Incompressible test objects may also be referred to as dimensionally stable. Especially in the case of a rigid test object, this does not change the outer shape thereof, even after complete evacuation. Gross leaks in particular are not identified with sufficient accuracy in such at least partially incompressible test objects, since during the evacuation phase all the gas present in the test object is drawn out, and consequently no gas remains during the measurement to generate any measurable increase in pressure.

It is the object of the invention to create an improved gross leak measurement on an at least partially incompressible test object in a film chamber.

The method according to the invention is defined by the features of claim 1.

The gross leak measurement takes place by comparing the change in pressure between the film chamber inside pressure prior to the same being connected to the calibration chamber in a gas-conducting manner and the film chamber inside pressure after the gas-conducting connection has been established between the film chamber and the calibration chamber in the case of an empty film chamber, which does not contain a test object, to the corresponding pressure difference in the case where an at least partially incompressible test object is present in the film chamber. In the case of a grossly leaking test object, which is to say a test object having a gross leak, the pressure difference is less than in the case of an empty film chamber or in the case of a tight test object or a test object having only a low leakage rate.

Typical values for the inner volume of the calibration chamber can range between 1 $cm^3$ and 10 $cm^3$ with a pressure inside the test chamber of approximately 1000 bar (atmospheric pressure) before the calibration valve is opened. Since the calibration chamber can be filled with ambient air, it may be necessary to determine the current air pressure using a suitable pressure gauge, and to accordingly correct the pressure difference that is present after the connection between the film chamber and the calibration chamber has been established.

The calibration chamber may be provided with a test leak having a known leakage rate. The inner volume of a grossly leaking rigid test object can be inferred from the increase in pressure resulting from the leakage rate of the test leak.

For faster leakage rate measurement, the pressure curve present in the film chamber after the calibration valve has been opened can be mathematically extrapolated based on an exponential function. This is in particular advantageous for detecting the pressure difference between the film chamber inner pressure before the calibration valve is opened and with full pressure equalization when the calibration valve is open. This is in particular advantageous when large test objects impede the gas flow inside the film chamber, causing the pressure equalization to take longer than when the film chamber is empty.

After the calibration valve has been opened, pressure equalization develops between the calibration volume (inner volume of the calibration chamber), which is initially subjected to the ambient pressure, and the film chamber volume, which has a considerably lower pressure. Depending on the nature and size of the test object, this pressure equalization takes place faster or more slowly. The final pressure to be expected once pressure equalization has taken place can be mathematically extrapolated based on an exponential function from at least two, and preferably three, consecutive measurement values of the film chamber pressure.

An exemplary embodiment of the invention will be described in greater detail hereafter based on the figures. In the drawings.

Figure 1:
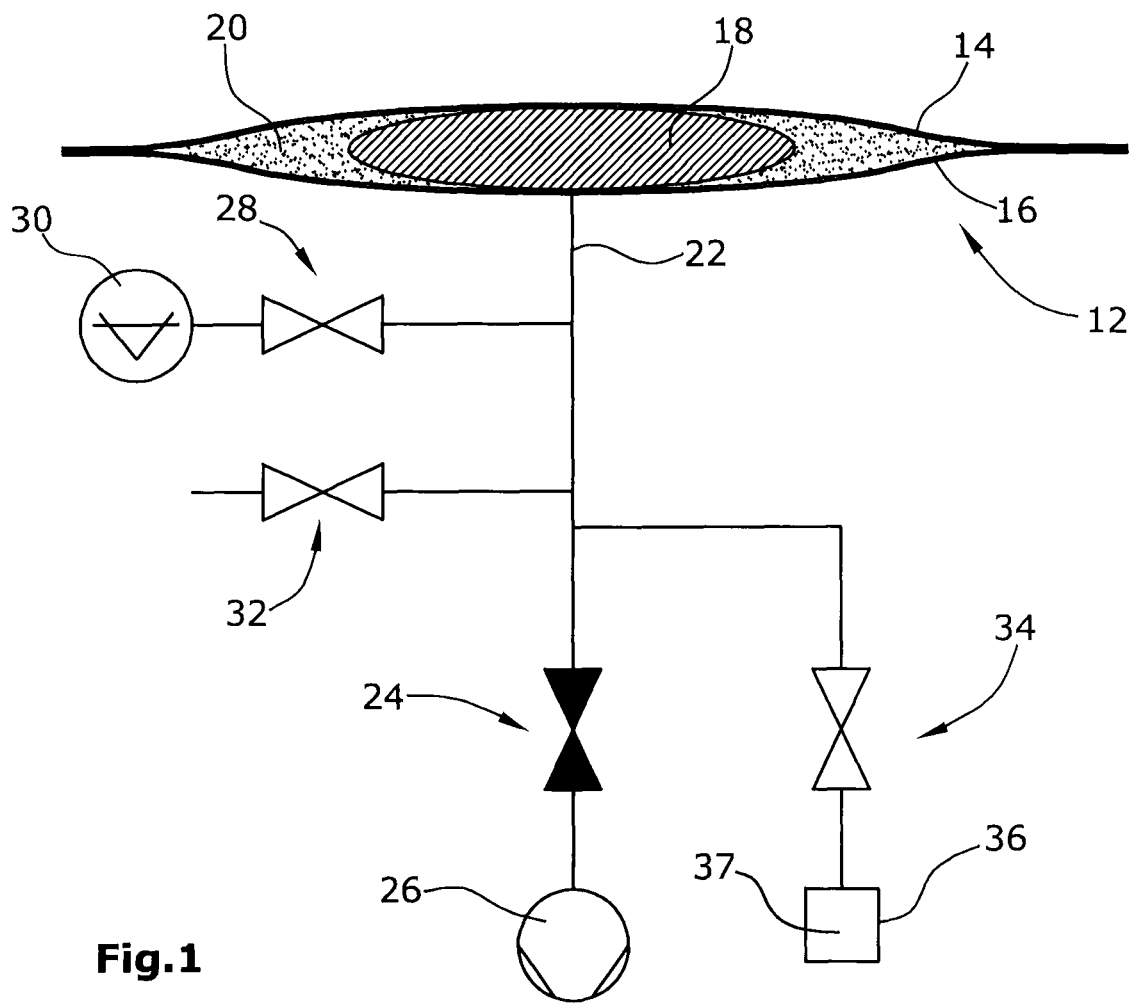
FIG. 1 shows a schematic representation in a first operating state.

The film chamber 12 is composed of two film layers 14, 16, which enclose a test object 18 and are joined to one another in a gas-tight manner in the edge region of the test object 18. The film layers 14, 16 enclose a film chamber volume 20 in the interior of the film chamber 12. In FIG. 1, the film chamber volume 20 is the volume inside the film chamber 12 in the region outside the test object 18.

Via a gas line 22, the interior of the film chamber 12 is connected in a gas-conducting manner via an evacuation valve 24 to a vacuum pump 26, via a measuring valve 28 to a pressure sensor 30, via a vent valve 32 to the atmosphere surrounding the film chamber 12, and via a calibration valve 34 to a calibration chamber 36.

The calibration chamber 36 encloses a calibration volume, which initially is filled with air under atmospheric pressure. The calibration valve 34 is initially closed. The figures show the open state of a valve by way of a solid valve, and the closed state of a valve by a non-solid valve. In the first operating state according to FIG. 1, the measuring valve 28, the vent valve 32 and the calibration valve 34 are thus closed. In contrast, the evacuation valve 24 is open. In the first operating state shown in FIG. 1, the test object 18 is located within the film chamber 12, which is closed in a gas-tight manner, while the vacuum pump 26 evacuates the film chamber 12 via the gas line 22 when the evacuation valve 24 is open.

Figure 2:
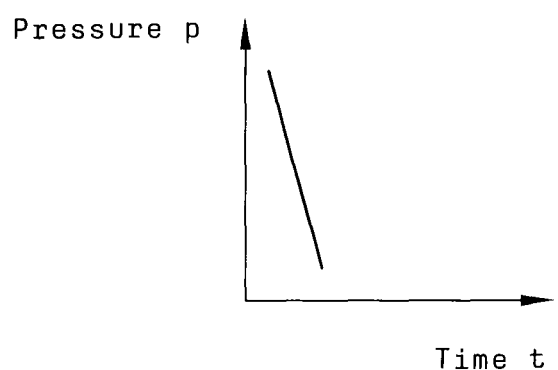
FIG. 2 shows the pressure curve in the first operating state.

FIG. 2 shows the pressure curve that develops during evacuation inside the film chamber 12. If the measuring valve 28 were open, the pressure sensor 30 would measure the pressure curve shown in FIG. 2. However, the measuring valve 28 is closed in FIG. 1 during evacuation of the film chamber 12 so as not to damage the pressure sensor 30.

Figure 3:
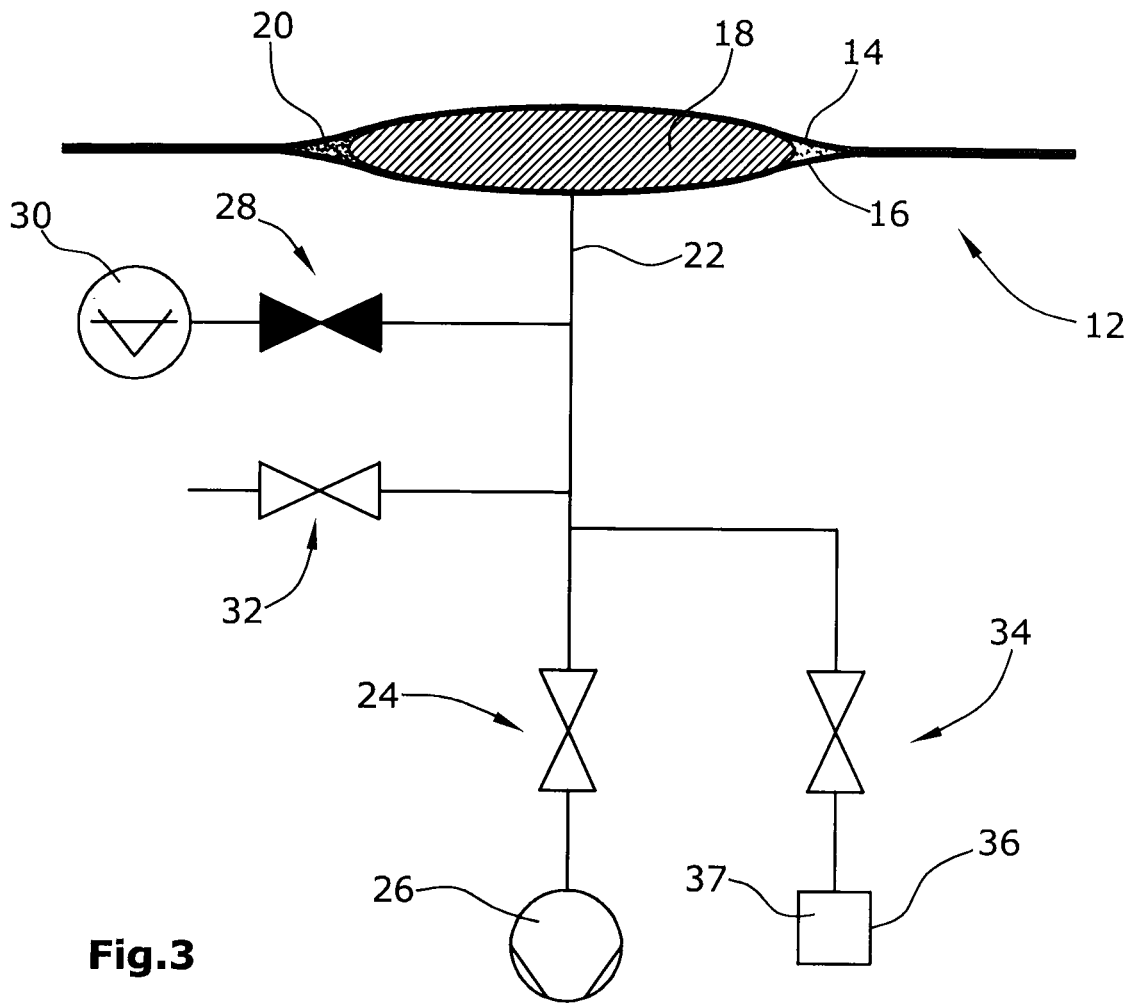
FIG. 3 shows the view according to FIG. 1 in a second operating state.
Figure 4:
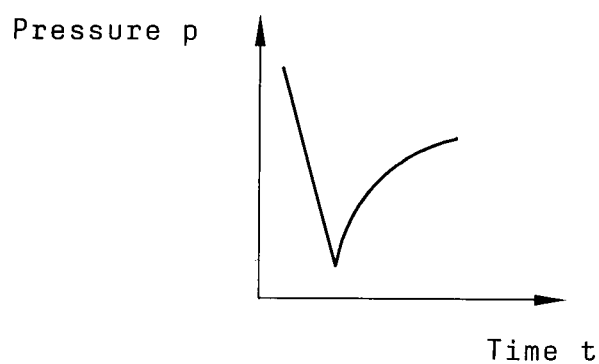
FIG. 4 shows the pressure curve in the second operating state.

FIG. 3 shows the subsequent operating state after the film chamber 12 has been evacuated. The evacuation valve 24 is closed (shown not solid), and the measuring valve 28 is open (shown solid). The hermetically sealed film chamber volume 20 is thus connected to the pressure sensor 30. As is shown in FIG. 4, the pressure sensor 30 measures an increase in pressure inside the film chamber 12 over the time t. This pressure increase may, on the one hand, result from a leak in the test object 18 and, on the other hand, from offset pressure. The offset pressure increase is an increase in pressure not caused by a leak in the test object 18, but by other physical effects, such as gas molecules outgassing from the film chamber wall.

Figure 5:
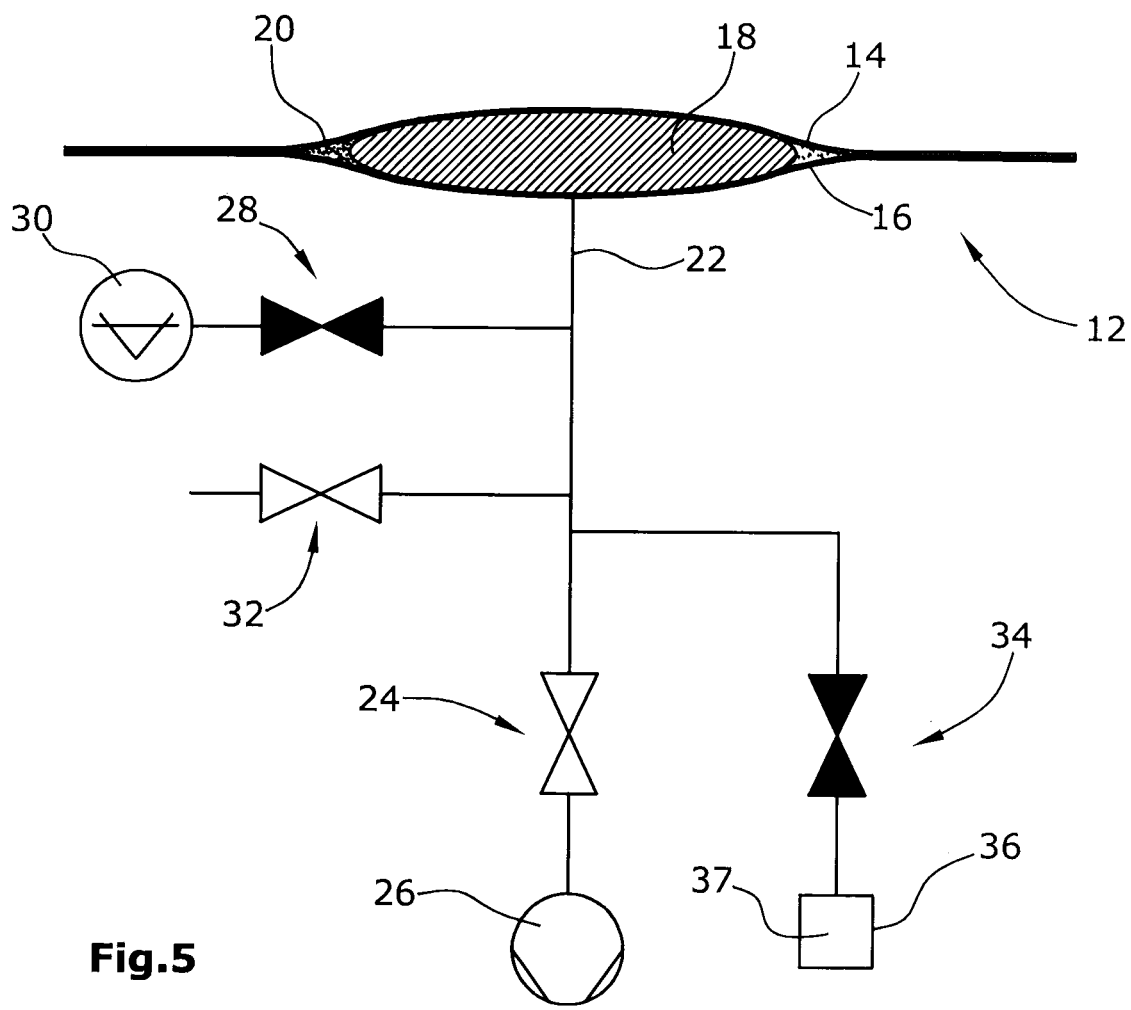
FIG. 5 shows the view according to FIG. 1 in a third operating state.

After the film chamber 12 has been evacuated (first operating state) and the measuring valve 28 has been opened (second operating state), the calibration valve 34 is now also opened. This third operating state is shown in FIG. 5. The air flows out of the calibration chamber 36 through the opened calibration valve 34, via the gas line 22, into the film chamber 12. Due to the large pressure difference between the vacuum inside the film chamber 12 and the atmospheric pressure inside the calibration chamber 36, the pressure in the film chamber 12 rises abruptly after the calibration valve 34 has been opened.

Figure 6:
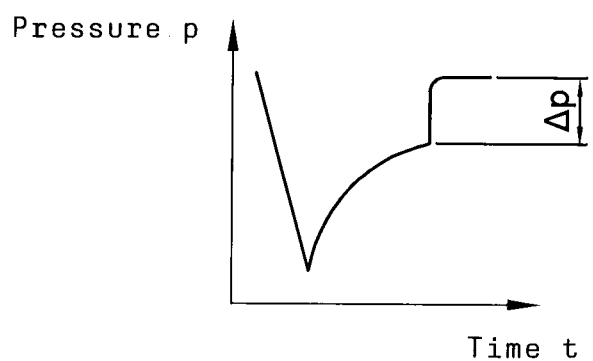
FIG. 6 shows the pressure curve in the third operating state.

This pressure stroke $\Delta p$ is shown in FIG. 6 and is measured by the pressure sensor 30. The pressure stroke $\Delta p$ is the difference between the pressure $p_G$ inside the film chamber 12 after the calibration valve 34 has been opened and the pressure $p_F$ inside the film chamber 12 before the calibration valve 34 is opened:

$$\Delta p = (p_G - p_F).$$

Since the total gas volume in the film chamber 12 and in the calibration chamber 36 remains the same before and after the calibration valve has been opened, the following applies:

$$p_G(V_F + V_V) = p_F V_F + p_V V_V,$$

where $P_G$: is the pressure inside the film chamber 12 after the calibration valve 34 has been opened;

$V_F$: is the film chamber volume 20 to be determined;

$V_V$: is the calibration volume 37 inside the calibration chamber 36 (in the range between ⅟1000 and ⅟10 of the film chamber volume without the test object); and $P_V$: is the pressure inside the calibration chamber 36 before the calibration valve 34 is opened (atmospheric pressure, approximately 1 bar).

Based on the pressure stroke $\Delta p = p_G - p_F$, it is possible to calculate the film chamber volume 20 as follows:

$$V_F = V_V \frac{(p_V - p_G)}{(p_G - p_F)} = V_V \frac{(p_V - p_G)}{\Delta p}.$$

The pressure $p_G$ considered in the consideration of the pressure stroke $\Delta p$ is preferably the final pressure $p_{End}$ that develops. The final pressure $p_{End}$ is the pressure that is present after the pressure equalization has taken place between the film chamber 12 and the calibration chamber 36, which is to say at the end of the settling process of the film chamber pressure after the calibration valve 34 has been opened.

The inner volume $V_{Innen}$ of the film chamber 12 when a test object 18 is present in the film chamber, such as an at least partially incompressible or even rigid and/or dimensionally stable test object, can be calculated as follows:

$$V_{Innen} = V_{leer}\left(\frac{\Delta p_{leer}(p_V - p_{G2})}{\Delta p_{prüfling}(p_V - p_{G1})} - 1\right)$$

and if the developing final pressures $P_{G1}$ and $P_{G2}$ after pressure equalization are small compared to the pressure in the calibration volume $p_V$, it can be calculated as follows:

$$V_{Innen} \approx V_{leer} \times \left(\frac{\Delta p_{leer}}{\Delta p_{prüfling}} - 1\right),$$

where
$V_{Innen}$: is the inner volume of the film chamber 12 comprising the test object 18 therein;
$V_{leer}$: is the inner volume of the empty film chamber 12 without the test object 18;
$\Delta p_{leer}$: is the pressure difference between the pressure in the film chamber 12 before connection to the calibration chamber 36 and after connection to the calibration chamber 36, with an empty film chamber 12;
$\Delta p_{Prüfling}$: is the pressure difference between the pressure in the film chamber 12 before connection to the calibration chamber 36 and after connection to the calibration chamber 36, when a test object is present in the film chamber 12;
$P_{G1}$: is the final pressure that is present with an empty chamber after the calibration volume has been connected to the film chamber; and
$P_{G2}$: is the final pressure that is present with a chamber that contains a test object after the calibration volume has been connected to the film chamber.

The inner volume $V_{leer}$ is determined by way of a one-time calibration using a known inner volume. For this purpose, a measurement is conducted with an empty chamber, and a measurement is conducted with a known inner volume $V_{Kal}$. The inner volume of the chamber is then determined as follows:

$$V_{leer} = \left(\frac{V_{kal}}{\left(\frac{\Delta p_{leer}(p_V - p_{G2})}{\Delta p_{prüfling}(p_V - p_{G1})}\right) - 1}\right),$$

or when $p_{G1}, p_{G2} \ll p_V$ $$V_{leer} = \left(\frac{V_{kal}}{\left(\frac{\Delta p_{leer}}{\Delta p_{prüfling}} - 1\right)}\right)$$

where $V_{Kal}$: is a known calibration volume. The magnitude of the calibration volume should range between ⅕ and 1/20 of the inner volume of the empty chamber $V_{leer}$.

Figure 7:
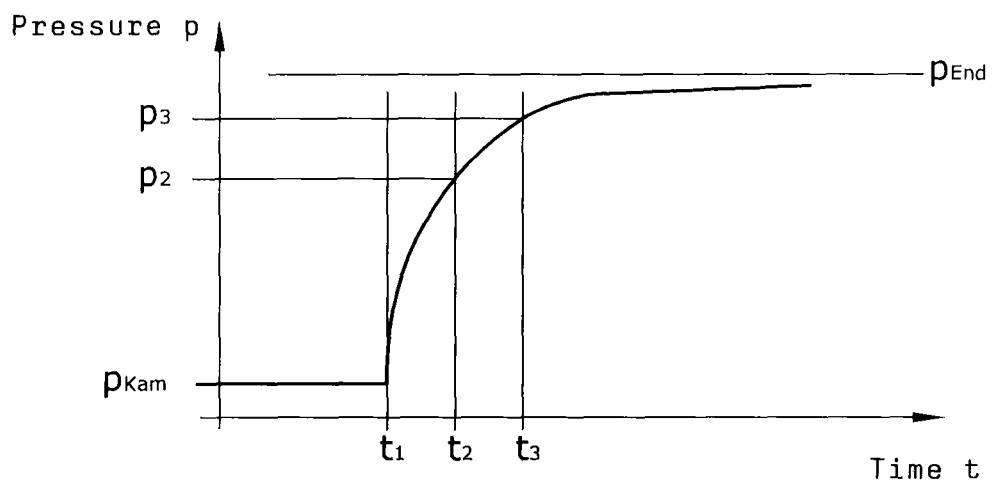
FIG. 7 shows a detailed view of the pressure curve according to FIG. 6.

FIG. 7 shows the settling process of the pressure p during the pressure equalization with an open calibration valve 34. If the pressure stroke $\Delta p$ that is considered as the pressure difference $P_{End} - P_{Kam}$, which is to say the difference between the film chamber inner pressure at the end of the settling process and the film chamber inner pressure before the settling process, the pressure curve p(t) can be mathematically described as a function of the time t during the settling process using the following formula:

$$p(t) = (p_{End} - p_{Kam}) \times (1 - e^{-t/Tau}) + p_{Kam},$$

where
p(t): is the instantaneous pressure at the point in time t;
$p_{Kam}$: is the pressure in the film chamber (12) before the gas-conducting connection between the film chamber and the calibration chamber (36) is established;
p2: is the pressure in the film chamber (12) at a point in time t2 after the connection between the film chamber and the calibration chamber (36) has been established;
p3: is the pressure in the film chamber (12) at a point in time t3 after the point in time t2;
$p_{End}$: is the final pressure in the film chamber (12) after the film chamber (12) and the calibration chamber (36) have been connected, preferably at the point in time t=∞,
t: is the time; and
Tau: is the time constant of the pressure settling process after the film chamber (12) has been connected to the calibration chamber (36).

Based on at least two consecutive pressure measurement values p2, p3, and preferably at least three consecutive pressure measurement values p1, p2, p3, the pressure curve p(t) can be extrapolated using the above formula. It is then not necessary to measure the pressure curve and wait until the final pressure $p_{End}$ has developed once the pressure equalization has taken place. Rather, it is possible to extrapolate the film chamber inner pressure even before the pressure equalization has taken place.

For identical intervals between the points in time t1, t2, and t2, t3, where t1 is the point in time at which the calibration valve 34 is opened, and t2 is between t1 and t3, it is then possible to calculate the final pressure $p_{End}$ as follows:

$$p_{End} = (p2 \times p2 - p_{Kam} \times p2)/(2 \times p2 - p_{Kam} - p3).$$

In this way, it is possible to calculate the final pressure $p_{End}$ that develops inside the film chamber before this final pressure develops with pressure equalization. Based on the final pressure thus calculated, the above-described pressure differences can be ascertained and compared to one another so as to identify a gross leak on an at least partially incompressible test object.

The invention claimed is:
1. A method for the gross leak measurement of an at least partially incompressible test object in a film chamber that comprises at least one flexible wall region and is connected, in a gas-conducting manner, to a pressure sensor, a vacuum pump and, by way of a calibration valve, to a calibration chamber enclosing a calibration volume, comprising the following steps:
evacuating the film chamber;
measuring a progression of a first pressure curve within the film chamber after the evacuation is completed;
connecting, in a gas-conducting manner, the calibration volume to the inner volume of the film chamber during the measurement of the progression first pressure curve, pressure being measured before the gas-conducting connection is established, and with the gas-conducting connection established, to the film chamber, and pressure in the calibration chamber prior to the connection to the film chamber being higher or lower than pressure in the film chamber, wherein the pressure difference $\Delta p_{empty}$ is the difference between pressure before the gas-conducting connection is established and pressure with a gas-conducting connection to the film chamber, in the case of an empty film chamber comprising no test object;

locating an object in the film chamber;

evacuating the film chamber;

measuring a progression of a second pressure curve within the film chamber when the test object is present after the evacuation is completed;

connecting, in a gas-conducting manner, the calibration volume to the inner volume of the film chamber during the measurement of the second pressure curve, pressure being measured before the gas-conducting connection is established, and with the gas-conducting connection established, to the film chamber, and pressure in the calibration chamber prior to the connection to the film chamber being higher or lower than pressure in the film chamber, wherein the pressure difference $\Delta p_{testing}$ is the difference between pressure before the gas-conducting connection is established and pressure with a gas-conducting connection to the film chamber when a test object is present in the film chamber; comparing $\Delta p_{empty}$ to $\Delta p_{testing}$.

2. The method according to claim 1, wherein the inner volume $V_{inside}$ of the film chamber, comprising the test object therein, is calculated as follows:

$$V_{Inside} = V_{empty}\left(\frac{\Delta p_{empty}(p_V - p_{G2})}{\Delta p_{testing}(p_V - p_{G1})} - 1\right)$$

or, when $p_{G1}, p_{G2} \ll p_v$ $$V_{Inside} \approx V_{empty} \times \left(\frac{\Delta p_{empty}}{\Delta p_{testing}} - 1\right),$$

where $V_{inside}$: is the inner volume of the film chamber comprising the test object therein;

$V_{empty}$: is the inner volume of the empty film chamber without the test object;

$\Delta p_{empty}$: is the pressure difference between the pressure in the film chamber before connection to the calibration chamber and the pressure in the film chamber after connection to the calibration chamber, with an empty film chamber;

$\Delta p_{testing}$: is the pressure difference between the pressure in the film chamber before connection to the calibration chamber and the pressure in the film chamber after connection to the calibration chamber, when a test object is present in the film chamber;

$P_{G1}$: is the final pressure that is present with an empty chamber after the calibration volume has been connected to the film chamber; and $P_{G2}$: is the final pressure that is present with a chamber that contains a test object after the calibration volume has been connected to the film chamber.

3. The method according to claim 1, wherein the inner volume of the empty chamber is determined by way of a comparative measurement of an empty chamber to a measurement having a know inner volume $V_{Cal}$, using the following relationship:

$$V_{empty} = \left(\frac{V_{cal}}{\left(\frac{\Delta p_{empty}(p_V - p_{G2})}{\Delta p_{testing}(p_V - p_{G1})} - 1\right)}\right),$$

or when $p_{G1}, p_{G2} \ll p_v$ $$V_{empty} = \left(\frac{V_{cal}}{\left(\frac{\Delta p_{empty}}{\Delta p_{testing}} - 1\right)}\right)$$

where $V_{cal}$: is a known calibration volume, having a magnitude between $\frac{1}{5}$ and $\frac{1}{20}$ of the inner volume of the empty chamber $V_{empty}$.

4. The method according to claim 1, wherein the calibration chamber is provided with a test leak having a known leakage rate, and the inner volume of the film chamber is ascertained taking into consideration the pressure increase that develops after the film chamber has been connected to the calibration volume.

5. The method according to claim 1, wherein the respective pressure differences between the pressure before the gas-conducting connection is established between the film chamber and the calibration chamber, and the final pressure inside the film chamber present with a gas-conducting connection between the film chamber and the calibration chamber are considered.

6. The method according to claim 5, wherein the final pressure that is present inside the film chamber with a gas-conducting connection between the film chamber and the calibration chamber is extrapolated based on an exponential function of the pressure curve that develops, which has at least two pressure values measured by way of the pressure sensor.

7. The method according to claim 6, wherein the following formula is used for the extrapolation of the developing final pressure:

$$p(t) = (p_{End} - p_{Kam}) \times (1 - e^{-t/Tau}) + p_{Kam},$$

where $p(t)$: is the instantaneous pressure at the point in time t;

$p_{Kam}$: is the pressure in the film chamber before the gas-conducting connection between the film chamber and the calibration chamber is established;

$p_{End}$: is the final pressure in the film chamber after the film chamber and the calibration chamber have been connected, preferably at the point in time $t=\infty$, t: is the time; and Tau: is the time constant of the pressure settling process after the film chamber has been connected to the calibration chamber.

8. The method according to claim 7, wherein, for equal time differences t2−t1=t3−t2, the final pressure is extrapolated as follows:

$$p_{End} = (p2 \times p2 - p_{Kam} \times p2)/(2 \times p2 - p_{Kam} - p3),$$

where
- p2: is the pressure in the film chamber at a point in time t2 after the connection between the film chamber and the calibration chamber has been established;
- p3: is the pressure in the film chamber at a point in time t3 after the point in time t2; and
- t1: is the point in time at which the calibration valve is opened.

* * * * *